Dec. 19, 1944.            C. H. TAYLOR            2,365,606
                  CONSTANT VELOCITY UNIVERSAL JOINT
                         Filed April 13, 1942
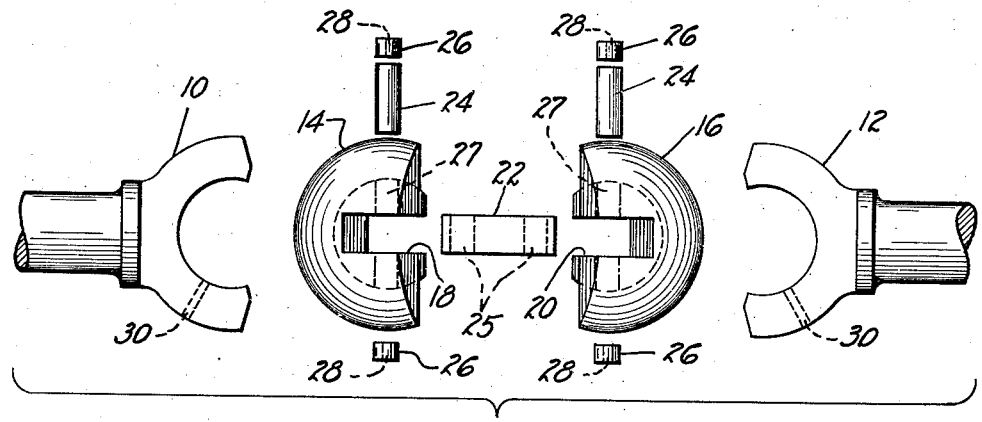
FIG.1
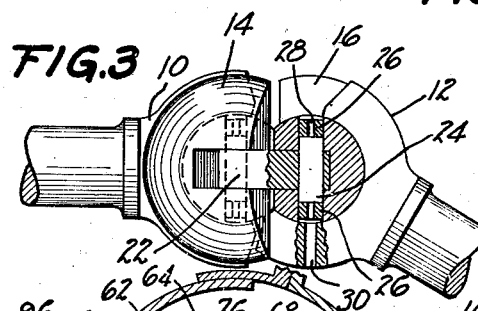
FIG.3
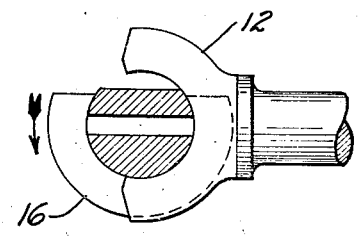
FIG.2
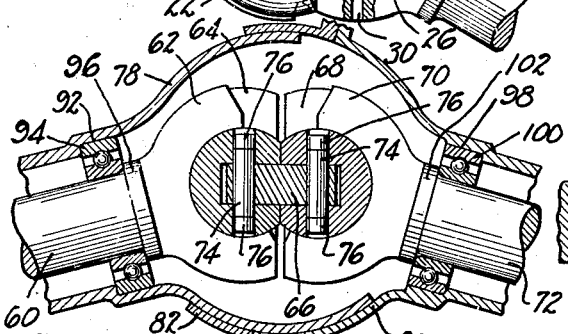
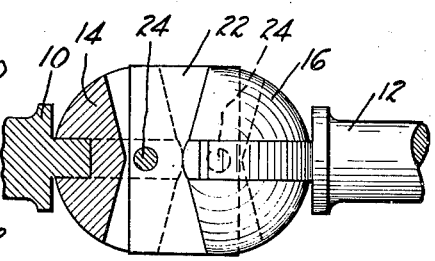
FIG.5    FIG.4
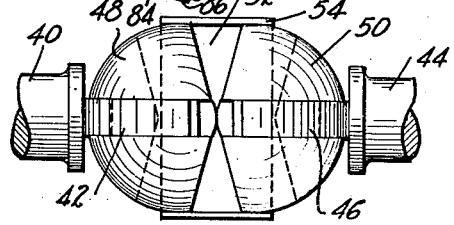
FIG.6
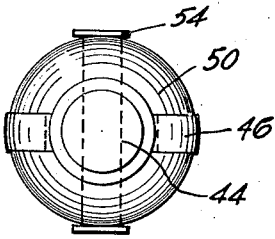
FIG.7
INVENTOR
CECIL H. TAYLOR
BY  A. R. McCrady
ATTORNEY Patented Dec. 19, 1944

2,365,606

UNITED STATES PATENT OFFICE 2,365,606

CONSTANT VELOCITY UNIVERSAL JOINT

Cecil H. Taylor, South Bend, Ind., assignor to Bendix Aviation Corporation, South Bend, Ind., a corporation of Delaware Application April 13, 1942, Serial No. 438,693

3 Claims. (Cl. 64—21)

The invention relates to improvements in universal joints of the constant angular velocity type, particularly to the application thereof in automotive vehicles employing front wheel drives.

In certain types of universal joints heretofore employed it has been difficult, if not impossible, to maintain the joint in assembled relationship either when shipping or when removing same from a vehicle, or other use.

It is an object of this invention to provide a universal joint which will maintain parts thereof in assembled relationship when removed from a vehicle.

It is an object to provide a joint which can be maintained in assembled relationship at all times but which will be easy to disassemble whenever desired.

Another object is to provide a joint which will be easy of manufacture, and which will be easy to assemble.

Still another object is to provide a universal joint having a freely movable element which will transmit torque and yet have little tendency to bind should there be a deficiency of lubricant present in the joint.

Yet another object is to provide a universal joint having a high working angle.

A further object is to provide a joint having a minimum of parts, and which will be easy to assemble during the manufacturing process or at any other time.

It is still further an object to provide a joint which will require parts which are relatively simple to forge and to machine.

Further objects will be apparent from a study of the following specification and drawing, in which:

Figure 1 is an exploded elevation view of the parts of one embodiment of the universal joint forming this invention;

Figure 2 shows one of the yoke members in elevation and the method whereby the torque-transmitting partly-spherical segment is attached to the yoke;

Figure 3 shows in elevation the joint of Figure 1 in assembled relationship, the right-hand half of part of the joint being shown in section;

Figure 4 is a plan view of the assembled position of the joint shown in Figure 1, the left-hand yoke member and the left-hand torque-transmitting partly-spherical segment being shown in section along the plane containing the radii which bisect the segment, which plane is also normal to the plane of the yokes;

Figure 5 is an elevation view of the assembled universal joint contained in a spherical housing which is shown in section, the torque-transmitting partly-spherical segments and the connecting plate being shown in section, the pins connecting same being shown in elevation;

Figure 6 shows a plan view of an alternate construction of the joint which employs a plate having end flanges for keeping the joint properly spaced and aligned; and Figure 7 is an end view of Figure 6 showing in more detail the structure of the center plane.

Referring to Figure 1, there is shown a left-hand driving yoke member 10. Rotation is transmitted to driven yoke member 12 through the medium of a connecting partly-spherical member 14, and a partly-spherical member 16, formed with slots 18 and 20 respectively, to receive a plate member 22. Plate member 22 is secured to the partly-spherical members 14 and 16 by means of pins 24 which have driven fits in bore 25 of the plate 22 and sliding fits in the radial bores 27 of partly-spherical members 14 and 16. A pair of bronze wear plugs 26 having a longitudinal bore 28 are positioned at each end of the pin 24.

One arm of each yoke member is provided with a radial bore 30 of a diameter small enough so that the wear plugs will be retained in place by the yoke arms. The diameter of these bores is large enough to accommodate a pin or a punch for a purpose which will be described later.

Since each yoke member embraces a central angle greater than 180° it is obvious that each yoke member cannot be attached to its attendant partly-spherical segment except by first placing the two parts in the position shown in Figure 2, and then rotating the segment through some angle from that shown in Figure 2 until the yoke engages the partly-spherical member. Likewise, because of this angle, which is greater than 180°, it is impossible to separate the two elements except by rotating the member with respect to the yoke through the same angle back to a position like that shown in Figure 2.

In Figure 3 is shown the joint completely assembled, and the manner in which the center plate 22 is secured to the partly-spherical segments 14 and 16. Figure 3 shows also the manner in which the joint may be first assembled and then disassembled. The procedure for assembling the universal joint is as follows.

The yoke member 12 is first connected to its associated partly-spherical member 16 as shown in Figure 2, and when each yoke is connected, the partly-spherical members must each be connected to the plate 22. This is accomplished as shown in Figure 3. The yoke member 12 is swung as shown and connecting pin 24 is press-fitted into the plate 22. The wear plug 26 is then placed back of the pin 24 and swaged into place by inserting a tapered pin into the bore of the plug 26 and then giving the pin a firm blow so that the metal of plug 26 engages the walls of bore 27 in frictional contact. The procedure is repeated on the plug which is adjacent the other end of the pin 24, after first rotating yoke member 12 counterclockwise until the upper limb of the yoke 12 is contiguous to the upper limb of yoke 10. In such a position it will be possible to insert the wear plug 26 in the bore 27 and then swage it in proper position by means of a tapered pin as described before.

After securing the right-hand yoke assembly to the plate 22 the same sequence of operations is applied to the left-hand assembly to secure it to the plate 22.

The completed assembly as shown in Figure 3 may be disassembled as follows. The right-hand yoke member 12 is rotated to the position shown in Figure 3, when the bore 30 in the yoke member will be in axial alignment with the bores 27 and 25 in the member 16 and the plate 22 respectively. A pin or a punch is inserted in the bore 30 and the two wear plugs 26 and the pin 24 are driven out. The same procedure is followed for the left-hand yoke member 10 to disassemble the joint.

Figure 4 is a plan view of the assembled joint shown in Figure 3, the left-hand spherical member 14 and left-hand yoke member being shown in section on a plane which bisects the plate member 22 along its smallest dimension. It will be noted that the members 14 and 16 respectively have curved nose surfaces to take the axial thrust from one yoke to the other. This construction aids in taking the shear on the pins 24, 24 which connect the plate 22 to the members 14 and 16.

The arrangement shown in Figure 4 shows the amount of angular displacement in the plane of the plate 22 permitted by the members 14 and 16 and the plate 22. The arrangement shown in Figure 5 illustrates the amount of angular displacement permitted by the yoke members 10 and 12 in the plane of the yokes. Since the torque transmitting plate has a bisecting plane which will always be in the planes containing the bisector of the angle between the two yoke members 10 and 12 and their attendant shafts, uniform velocity will be transmitted from one yoke to the other. This requirement to achieve uniform angular velocity is known to those skilled in the art and will not be explained in further detail here.

In Figures 6 and 7 there is shown another embodiment of the invention making unnecessary the pin connection between the plate 22 and partly-spherical segments 14 and 16 which was described with reference to Figures 1, 2, 3 and 4.

The joint shown in Figures 6 and 7 comprises a driving shaft 40 to which is integrally attached a yoke 42. Driven shaft 44 is integrally attached to driven yoke 46. The yokes 42 and 46 are in cooperating engagement with partly-spherical members 48 and 50 respectively and are connected as described with reference to Figure 2. A recess in each of the members 48 and 50 corresponding to the slotted portions 18 and 20 of Figure 1 receives a plate 52 having flanges or heads 54 at each end of the plate and immediately adjacent to the outer surfaces of the members 48 and 50.

The embodiment shown in Figures 6 and 7 has an advantage in that the center plate 52 is free to take any position in the slotted recesses of the members 48 and 50, and is only restrained in movement by the flanges 54 which cooperate with the members 48 and 50. Such freedom of movement insures that the center plate 52 will always seek the position of least restraint in the recess of the members 48 and 50. Since the plate 52 is never forced by movement of the members 48 and 50 into any particular position in the recesses it is apparent that the plate will tend to float, following the movement of either 48 or 50 whichever at the moment presents the highest frictional contact with the plate. Hence the momentary friction between plate and its contacting members is always minimum and the rubbing areas are constantly shifting. This results in creation of smaller amounts of heat caused by friction and greatly reduces the chance of seizure of the rubbing surfaces, a decided advantage.

In Figure 5 a universal joint like that described with reference to Figures 1, 2, 3 and 4 is shown enclosed in a housing. The housing may be of the type used as a dirt and grease seal, or may be of the steering-axle type used in front-wheel drives for automotive vehicles.

The universal joint shown in Figure 5 consists of a driving shaft 60 to which is integrally attached driving yoke 62. Torque is transmitted from driving yoke 62 to partly-spherical member 64, and thence to plate 66, from whence it is transmitted in turn to partly-spherical member 68 and to driven yoke 70, and then to driven shaft 72. The plate 66 is secured to the members 64 and 68 through the media of pins 74 and retaining plugs 76 in a manner described before with reference to Figures 1, 2, 3 and 4.

The entire assembly is enclosed in a housing consisting of a hemispherical bell 78, a hemispherical bell 80 of larger diameter than bell 78, and a partly-spherical ring 82 in sliding contact with bell 78 and attached to bell 80. Ring 82 and bell 80 may be provided with annular flanges 84 and 86 respectively which may be brought together in the manner shown as by bolts 88 through holes spaced in each flange and which are secured by nuts 90.

Provided in connection with the housing are bearing means for supporting the shaft immediately adjacent the universal joint. Hemispherical bell 76 contains a bearing seat 92 against which is positioned a bearing 94 which is shown as a ball bearing. The bearing 94 is mounted on driving shaft 60 adjacent an upset portion 96 on the shaft 60. Hemispherical bell 80 is provided with a similar bearing seat 98, a bearing 100 which is mounted upon driven shaft 72 immediately adjacent to upset portion 102.

Although this invention has been described with reference to desirable embodiments thereof, it is not intended that its scope be limited to the embodiments shown, which are for purposes of illustration only, nor otherwise than by the terms of the claims appended hereto.

I claim:

1. A universal joint comprising a driving member and a driven member, a pair of partly-spherical members associated one each with said driving and driven members, said partly-spherical members having cooperating curved nose surfaces adapted to take the axial thrust transmitted from the driving member to the driven member a recess in each of the partly-spherical members adapted to receive a plate-like element to transmit torque from the driving member to the driven member, a pair of bores in each of the partly-spherical members and the plate-like element, the bores of the plate-like element being coaxial with the first mentioned bores, a pair of pins associated one with each set of bores for holding the partly-spherical members to the plate-like element, a pair of bores associated one with the driving member and one with the driven member and so disposed with reference to each partly-spherical member that upon rotation of the member its associated bore is in axial alignment with the other bores so that the pin may be removed to disassemble the joint.

2. A universal joint comprising a driving yoke and a driven yoke, a pair of partly-spherical members associated one each with said driving and driven yokes, said partly-spherical members having cooperating curved nose surfaces adapted to take the axial thrust transmitted from one of said yokes to the other, said driving and driven yokes embracing central angles of more than 180° whereby permanence of assembly is maintained with their associated partly-spherical members, a recess in each of the partly-spherical members adapted to receive a plate-like element to transmit torque from the driving yoke to the driven yoke, a pair of bores in each of the partly-spherical members and the plate-like element, the bores of the plate-like element being coaxial with the first mentioned bores, a pair of pins associated one with each set of bores for holding the partly-spherical members to the plate-like element, a pair of bores associated one with the driving yoke and one with the driven yoke and so disposed with reference to each partly-spherical member that upon rotation of the yoke its associated bore is in axial alignment with the other bores so that the pins may be removed to disassemble the joint.

3. A universal joint comprising a driving yoke and a driven yoke, a pair of partly-spherical members associated one each with said driving and driven yokes, said yokes embracing central angles of more than 180° whereby permanence of assembly is maintained with their associated partly-spherical members, a recess in each of the partly-spherical members adapted to receive a plate-like element to transmit torque from the driving member to the driven member, a pair of bores in each of the partly-spherical members and the plate-like element, the bores of the plate-like element being coaxial with the first mentioned bores, a pair of pins associated one with each set of bores for holding the partly-spherical members to the plate-like element, a plurality of plugs located one at each end of said pins and adapted to be swaged in the partly-spherical members to hold said pins in position, a pair of bores disposed one in the driving yoke and one in the driven yoke so disposed with reference to each partly-spherical member that upon rotation of the yoke its associated bore is in axial alignment with the other bores so that the pins may be removed to disassemble the joint.

CECIL H. TAYLOR.